United States Patent
Muenzenberger et al.

(12)

(10) Patent No.: US 10,468,865 B2
(45) Date of Patent: Nov. 5, 2019

(54) INSTALLATION BLOCK FOR A DRY WALL, DRY WALL AND METHOD FOR INSTALLING AN INSTALLATION BLOCK

(71) Applicant: Hilti Aktiengesellschaft, Schaan (LI)

(72) Inventors: Herbert Muenzenberger, Wiesbaden (DE); Thomas Monden, Stetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/313,888

(22) PCT Filed: May 26, 2015

(86) PCT No.: PCT/EP2015/061501
§ 371 (c)(1),
(2) Date: Nov. 23, 2016

(87) PCT Pub. No.: WO2015/181111
PCT Pub. Date: Dec. 3, 2015

(65) Prior Publication Data
US 2017/0194779 A1    Jul. 6, 2017

(30) Foreign Application Priority Data
May 26, 2014 (EP) .................................. 14169798

(51) Int. Cl.
*H02G 3/00* (2006.01)
*H02G 3/38* (2006.01)
(Continued)

(52) U.S. Cl.
CPC ............ *H02G 3/388* (2013.01); *E04B 2/7457* (2013.01); *F16L 5/00* (2013.01); *F16L 5/04* (2013.01);
(Continued)

(58) Field of Classification Search
CPC .......... H05K 9/0073; H05K 5/02; H02G 9/00; H02G 9/10; H02G 3/04; H02G 3/06;
(Continued)

(56) References Cited

U.S. PATENT DOCUMENTS 802,556 A  *  10/1905  Mccoy ................... E04B 9/28
                                                                52/241
4,869,037 A  *  9/1989  Murphy ................. E04B 1/642
                                                                52/238.1
(Continued)

FOREIGN PATENT DOCUMENTS

DE    94 19 912 U1    4/1995
EP    1 591 597 A1    11/2005
(Continued)

OTHER PUBLICATIONS

Martin (EP 1591597 A1 English Translation).*
(Continued)

*Primary Examiner* — Pete T Lee
(74) *Attorney, Agent, or Firm* — Crowell & Moring LLP

(57) ABSTRACT

An installation block for dry walls is disclosed. The installation block includes at least one through-hole for passing through a cable, pipe, or the like. The installation block also includes two installation block parts, which are joined together and have a separating plane T, which intersects with the at least one through-hole. Further, a dry wall and a method for installing an installation block are disclosed.

7 Claims, 2 Drawing Sheets

(51) Int. Cl.
*E04B 2/74* (2006.01)
*F16L 5/04* (2006.01)
*F16L 5/14* (2006.01)
*H02G 3/22* (2006.01)
*F16L 5/00* (2006.01)

(52) U.S. Cl.
CPC ................ *F16L 5/14* (2013.01); *H02G 3/22* (2013.01); *E04B 2/7411* (2013.01); *E04B 2002/7488* (2013.01)

(58) Field of Classification Search
CPC . H01H 9/02; H02B 1/50; H01G 4/224; B60R 16/0207; H01L 23/48; H01R 9/0518; H01R 9/0521; H01R 9/05; H01B 7/0045; H01B 17/30; H01B 17/305
See application file for complete search history.

(56) References Cited

U.S. PATENT DOCUMENTS

| | | | | |
|---|---|---|---|---|
| 4,889,298 | A * | 12/1989 | Hauff | F16L 5/08 174/503 |
| 2002/0043038 | A1 * | 4/2002 | Cerrato | E04B 1/703 52/604 |
| 2007/0234660 | A1 * | 10/2007 | Humphrey | E04B 2/18 52/284 |
| 2008/0104911 | A1 * | 5/2008 | Jarvie | E04B 2/8641 52/309.1 |

FOREIGN PATENT DOCUMENTS

| | | | |
|---|---|---|---|
| NL | 8901950 A | 2/1991 | |
| WO | WO 2010/089291 A2 | 8/2010 | |
| WO | WO-2010090581 A1 * | 8/2010 | ............... F16L 5/08 |

OTHER PUBLICATIONS

PCT/EP2015/061501, International Search Report (PCT/ISA/210) dated Jul. 22, 2015, with partial English translation, enclosing Written Opinion of the International Searching Authority (PCT/ISA/237) (Twelve (12) pages).

\* cited by examiner

INSTALLATION BLOCK FOR A DRY WALL, DRY WALL AND METHOD FOR INSTALLING AN INSTALLATION BLOCK

This application claims the priority of International Application No. PCT/EP2015/061501, filed May 26, 2015, and European Patent Document No. 14169798.7, filed May 26, 2014, the disclosures of which are expressly incorporated by reference herein.

BACKGROUND AND SUMMARY OF THE INVENTION

The invention relates to an installation block for a dry wall with a wall through-hole for cables or pipes and a corresponding dry wall as well as a method for installing an installation block.

Owing to the statutory regulations in the case of fire protection, in particular the general building approvals (ABZ) and inspection results (ABP), different requirements for fire protection arise depending on the application field. For example, it is required in the case of space-enclosing components such as walls, depending on defined environmental conditions, for distances of conduit passages of more than 50 mm, more than 100 or 200 mm to he maintained with respect, to partitioning such as fireproof doors. Under certain conditions, a defined distance must also be maintained, for example at least 50 mm from one wall passage to an adjacent wall passage.

In the case of constructing a dry wall, a stud frame is usually first installed, which provides the frame and to which dry wall construction panels are lastly fixed in order to form the dry wall construction. Then conduits or pipes are laid. This would be the correct time to install fire protection together with the conduits or pipes. However, electricians, ventilation fitters or pipe layers are not responsible for the fire protection. In order to maintain the prescribed distances, annular gaps, attachments, etc., there are tools by means of which the fire protection conditions can be easily maintained.

For example, inserts are used to define the position and size of the passages which are also called installation box, installation frame or cladding tube. These inserts comprise passages which ensure guidance of the pipes, conduits and cables according to the standard requirements. After installing these inserts, the cables, conduits and pipes can be easily guided through the passages.

However, it may occur that the fire protection is only installed after the conduits or pipes have already been laid. In this case, it is therefore very difficult to install the fire protection since the conduits and pipes can no longer be guided through the passages of the known inserts.

The object of the invention is to generally facilitate the installation of fire protection in the case of a dry wall.

The object underlying the invention is solved with the objects and methods of the independent claims. Advantageous embodiments are shown in the dependent claims.

The invention relates to an installation block for dry walls comprising at least one through-hole for passing a cable, pipe or the like through and at least two installation block parts which can be joined together and have a separating plane which intersects with the at least one through-hole. The separation of the installation block into at least two installation block parts facilitates the installation since the installation block can also be quickly and easily installed in the case of already laid conduits, cables or pipes or also in the case of already installed fire protection and other sealing systems. To this end, a first installation block part is laid for example from below the already laid conduits and a second installation block part is placed from above on the first installation block part. As a result, the installation block is closed and the at least one through-hole is defined. The through-hole is sealed in particular on all sides in the joined state.

In particular, the separating plane of the installation block parts lies in the plane of the longitudinal axis of the at least one through-hole. The two installation block parts can be hereby exchanged with each other since they are formed in an identical manner. This simplifies the storage as well as the installation since no distinction has to be made between an upper and a lower installation block part.

Alternatively, however, the separating plane may be distant from the plane of the longitudinal axis so that an installation block part is formed with a larger receiving section. The already laid conduits, cables and pipes can be inserted and kept better in this larger receiving section.

According to an aspect of the invention, the installation block has at least one installation section via which the installation block can be installed in a track of a stud frame of a dry wall, in particular respectively one installation section at two opposing sides of the installation block. The installation block can be held securely in the track of the stud frame via the installation section and can be attached there. The installation section can be for example screwed with the track in order to attach it. Corresponding thread openings can be provided in the installation block for this purpose.

In particular, the installation section is formed as a lateral protrusion of the installation block, which has an installation section thickness that is smaller than the installation block thickness. The installation section designed as a protrusion fits into the space that is formed between the edges of the profiles normally used with the stud frame. The difference of the thicknesses, i.e., the installation block thickness and the installation section thickness, is at least 10 mm, whereby both thicknesses are measured in the same direction in general terms, the difference in thickness of the installation block and the installation section may be identical to the material thickness of the profile plus the thickness of the dry wall construction panels to be installed. A recess-free intersection from the dry wall construction panel to the installation block may be hereby ensured in the case of a completed dry wall.

A further aspect of the invention provides for the installation section to be arranged centrally at the respective side of the installation block. It is hereby guaranteed that the installation block parts are also exchangeable with each other with respect to their attachment on the stud frame or reception in the tracks.

According to a further aspect of the invention, the density of the installation block is less than 1.1 kg/l (kilogram per liter) and greater than 0.5 kg/l. In particular, the density is less than 0.9 kg/l. A low density corresponds to a low weight at constant volume, which facilitates handling. The low weight is also advantageous since the stud frame is not usually designed for carrying heavy loads. In fact, the stud frame serves as a track, contact and attachment part for the dry wall construction panels.

The installation block preferably comprises mineral fibers, in particular rock wool or glass fibers or inorganic, i.e., non-flammable, lightweight fillers. These lightweight fillers are in particular glass foam, expanded perlite, hollow glass spheres, expanded clay or the like and/or mixtures of these fillers. Depending on the field of use, different requirements for the material arise with respect to the weight and the fire protection properties. The requirements can be correspondingly addressed by the selection of the materials. The installation block may further comprise gypsum or a gypsum mixture.

The invention further relates to a dry wall comprising a stud frame and an installation block of the previously described type, wherein the installation block is arranged between profiles of the stud frame. In particular, the installation block is attached to the profiles. The term "between" must be understood in that the profiles are arranged opposite each other, wherein their sides and a space there-between span. The installation block extends at least within this spanned space. They may in particular be edges of the profiles here that simultaneously form the track.

In particular, the installation block comprises at least one installation section that is received in a track of a profile of the stud frame. A connection of the mentioned parts can thus be achieved by simple screwing. Further, the positioning and installation of the installation block within the stud frame may be carried out in a simple manner.

According to an aspect of the invention, the dry wall has a thickness that corresponds to the installation block thickness. In this regard, a tolerance of in particular +/− 3 mm, preferably 0.5 mm shall apply. The installation block thus fits into the stud frame such that the dry wall is formed so as to be free of recesses.

A further aspect of the invention provides for at least one dry wall construction panel to be applied to the stud frame and an intersection from the dry wall construction panel to an adjacent installation block to be provided in the normal direction of the dry wall largely in a recess-free manner. The installation block is a single component and forms the visible surface to both sides of the dry wall simultaneously with the respectively applied dry wall construction panel. The dry wall construction panels may be positioned in a simple manner flush on the installation block and no gap occurs, which has to be filled. The dry wall construction panel may in particular be gypsum wall board.

The invention further relates to a method for installing an installation block of the previously described type in a dry wall, in particular a dry wall through which cables, pipes or the like have already been laid, whereby one of the installation block parts of the installation block is inserted into a stud frame, and at least one cable, pipe or the like is inserted into the installation block part, and the second installation block part is inserted into the stud frame such that the installation block is formed. The installation block may thus be installed subsequent, i.e., in the case of already laid cables or pipes. The time of the installation of the fire protection is therefore not critical when using the installation block according to the invention.

A further aspect of the invention provides for the two installation block parts to be attached in the stud frame such that the installation block is connected to the stud frame. This ensures that the installation block is positioned correctly and kept fixed in the stud frame.

DETAILED DESCRIPTION OF THE DRAWINGS

Figure 1:
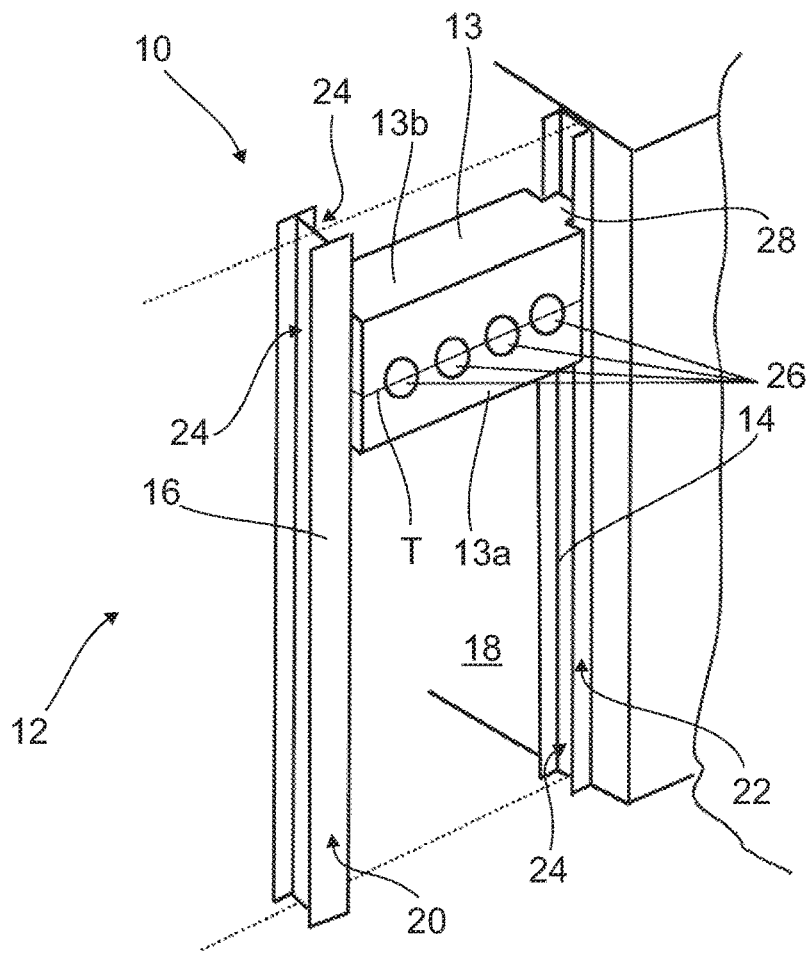
FIG. 1 is a schematic view in a perspective illustration of a dry wall under construction.

In the perspective view according to FIG. 1, a still incomplete dry wall 10 is illustrated during the construction thereof which has a stud frame 12 and an installation block 13. Dashed lines show how the completed dry wall 10 should be built.

The stud frame 12 comprises profiles 14, 16, wherein a first profile 14 is attached, in particular screwed, to a room wall 18. The stud frame 12 further comprises profiles, not illustrated here for reasons of clarity, which are attached to the floor and the ceiling. The profiles 14, 16 are inserted into these profiles that are not illustrated in order to form the stud frame 12.

The profiles 14, 16 respectively comprise contact surfaces 20, 22 to which a dry wall construction panel, not illustrated here, may be attached. On the side opposed to the contact surfaces 20, 22, further contact surfaces are formed to which a dry wall construction panel may likewise be attached. The dry wall 10 is defined by the two dry wall construction panels still to be installed.

The profile 14 comprises a U-shaped cross-sectional profile in the embodiment shown, whereas the profile 16 has an H-shaped cross-sectional profile. The selection of the cross-sectional profile may for example be made depending on the installation situation.

The profiles 14, 16 respectively comprise at least one track 24 which is formed by the protruding edges at which the contact surfaces 20, 22 are formed.

The installation block 13 may be attached in two opposing tracks 24 of two spaced profiles 14, 16.

In the embodiment shown, the installation block 13 comprises four circular through-holes 26 arranged centrally next to each other which serve as passages for cables and pipes or the like.

Figure 3:
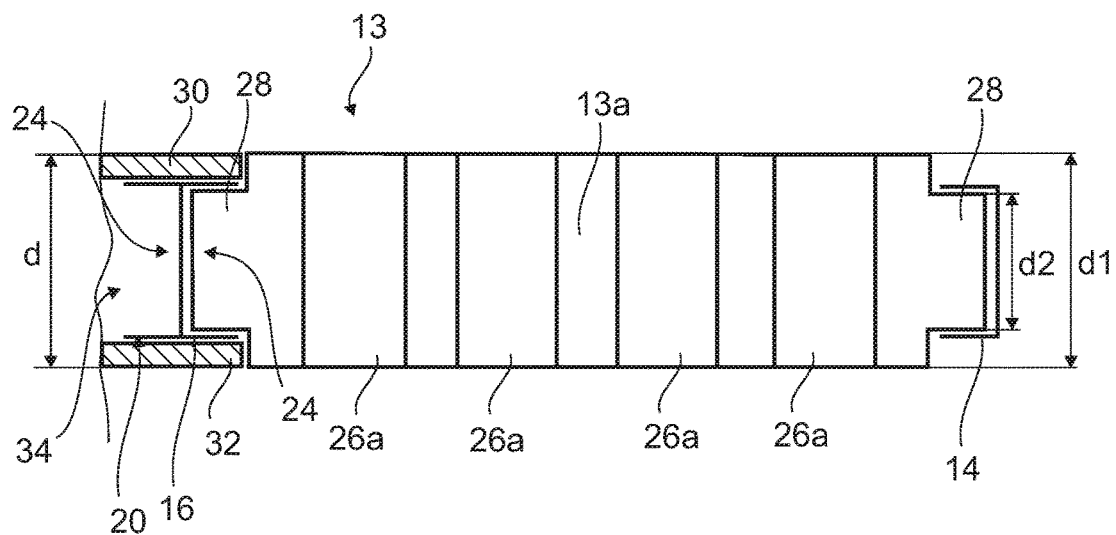
FIG. 3 is a section through the separating plane T of a partially completed dry wall.

In order to attach the installation block 13 to the stud frame 12, the installation block 13 also comprises installation sections 28 which are received in the tracks 24 of the profiles 14, 16 as explained in greater detail by means of FIG. 3.

In the embodiment shown, the installation block 13 further consists of two installation block parts 13a, 13b which are illustrated joined together in FIG. 1. The two installation block parts 13a, 13b may be separated in separating plane T illustrated in a dashed manner.

The installation block 13 may thus be installed subsequent in a simple manner even in the case of already laid conduits, cables or pipes, as explained in the following.

Figure 2:
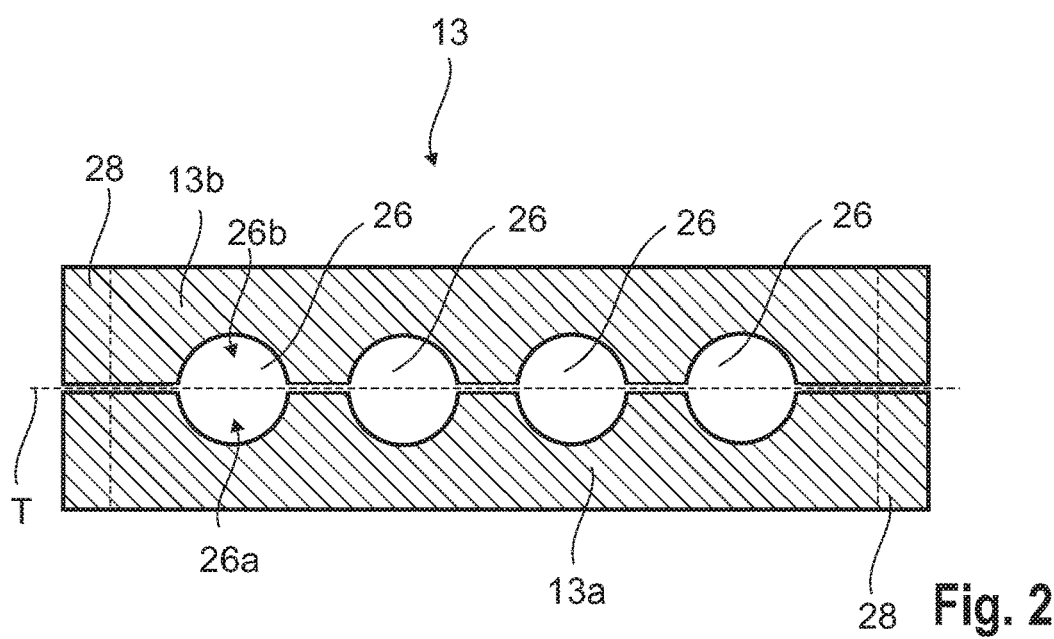
FIG. 2 is a vertical section through an installation block.

The installation block 13 and the two installation block parts 13a, 13b emerge in more detail from FIG. 2. In the embodiment shown, the two installation block parts 13a, 13b are formed identically such that each of the installation block parts 13a, 13b comprises an equal through-hole section 26a, 26b.

By forming the two installation block parts 13a, 13b identically, the installation block parts 13a, 13b may be exchanged with each other. This facilitates the storage and the installation since no distinction has to be made between an upper and a lower installation block part.

Alternatively, the installation block parts 13a, 13b may also be formed unequally such that for example the installation block part 13a has a larger through-hole section 26a such that the insertion of the cables and conduits is simplified in the case of an installation, as described in the following.

It is further apparent from FIG. 2 that the installation sections 28 are provided on both opposing sides of the respective installation block parts 13a, 13b.

FIG. 3 shows a horizontal section through the dry wall 10 of FIG. 1 in the separating plane T at a later time such that the installation block part 13a is viewed from above.

At said later time, two dry wall construction panels 30, 32 are already attached to the profile 16 or on its contact surface 20 and the opposing contact surface. The dry wall construction panels 30, 32 may be gypsum wall boards.

It also emerges from FIG. 3 how the installation block 13 or the installation block part 13a is received in the tracks 24.

The installation sections 28, arranged at both ends in the longitudinal direction which corresponds to the longitudinal direction of the dry wall, are formed as lateral protrusions. The insertion of the installation block parts 13a, 13b may occur by way of alignment inclined to the profiles 14, 16 such that the installation sections 28 are merged into the tracks 24.

Using a screw connection, not shown, by means of dry-construction screws through the respective profile 14, 16 and the installation sections 28, the parts may be attached to each other.

It further emerges from FIG. 3 that the two dry wall construction panels 30, 32 connect flush with the installation block 13, i.e., no recess towards the installation block 13 occurs. In the thickness direction of the dry wall 10, the outer surfaces of the dry wall construction panels 30, 32 are thus planar to the adjoining end faces of the installation block 13. This is due to the thickness d of the dry wall 10 corresponding exactly to the installation block thickness d1.

The installation sections 28 comprise an installation section thickness d2 which corresponds approximately to the distance of the edges of the tracks 24 such that the installation block parts 13a, 13b may thus be securely guided.

The two dry wall construction panels 30, 32 further form an empty space 34 into which insulating material may be inserted, such as rock wool, in order to provide heat insulation, noise insulation and fire protection.

The assembly of a dry wall preferably occurs as follows.

The floor and ceiling profiles, that are not shown in FIG. 1, are first attached. Then profiles 14 are attached to existing room walls 18 which preferably have a U cross-sectional profile. Further vertical profiles 16 may also be inserted into the receiving regions of the floor and ceiling profiles, where they may be optionally attached or held exclusively by clamping. The vertical profiles 16 may in particular comprise an H cross-sectional profile. The stud frame 12 is thus constructed.

At least one installation block 13 is subsequently attached at a desired position to the profiles 14, 16. If the installation block 13 is installed prior to the laying of any pipes, conduits or cables, then the installation block 13 may be installed in one piece. In case the pipes, conduits or cables have already been laid, the installation block 13 is installed as follows.

The first installation block part 13a is firstly inserted or merged into the tracks 24 below the already laid conduits, cables or pipes.

Then the second installation block part 13b is inserted or merged into the tracks 24 above the already laid conduits, cables or pipes.

The two installation block parts 13a, 13b are subsequently moved such that they form the installation block 13 and the conduits, cables and pipes are received in the through-holes 26.

The two installation block parts 13a, 13b may now be attached to the stud frame 12 such that the installation block 13 is fixed. The dry wall construction panels 30, 32 are subsequently attached to the profiles 14, 16 of the stud frame 12 such that a complete wall results. In this regard, the visible side, i.e., the vertical outer side of the installation block 13, is integrated into this wall in a recess-free manner.

The installation block 13 preferably comprises a rectangular cross section on the visible side. The adjacent dry wall construction panels may thus be formed into the required shape and size by sections aligned straight and at right angles to each other. This is a cutting process which may be carried out easily, quickly, cleanly and accurately even under assembly conditions.

The few gaps present between the dry wall construction panels 30, 32 and the installation block 13 may now be filled with a filler. Since the visible surfaces of the mentioned components are in one plane, the filling can be carried out easily and cleanly.

Since the material of the installation block 13 is preferably a gypsum material and the dry wall construction panels 30, 32 likewise preferably consist of a gypsum material, material uniformity prevails. This material uniformity facilitates the filling. The installation block 13 may also preferably be coated on the visible surface with the same cardboard or board which is used for the dry wall construction panels 30, 32. As a result, the same surface quality or roughness is also achieved.

The construction of the dry wall 10 is hereby substantially completed. The through-holes 26 are then sealed according to fire protection regulations. Rock wool, fire-retardant foams, fire stop plugs, sealant, wrap, speed sleeve, etc., are suitable for this purpose.

Figure 4:
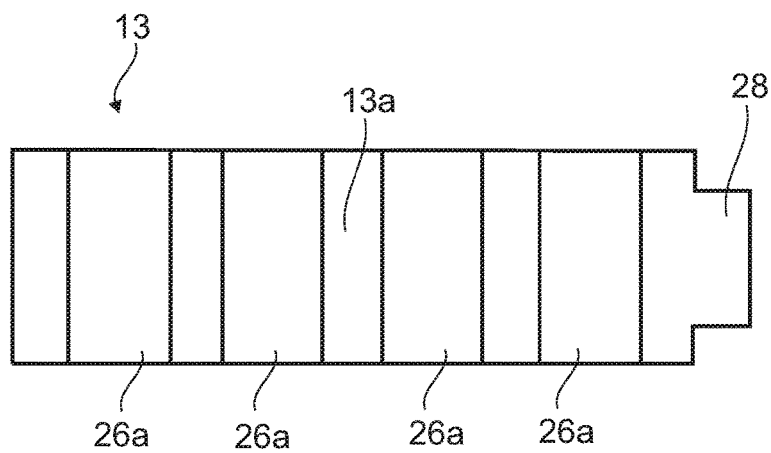
FIG. 4 is a section through the separating plane T of an alternative embodiment of the installation block.

An alternative embodiment of the installation block 13 is illustrated in FIG. 4, and it is shown in cross section in the separating plane T such that the installation block 13a is viewed from above.

It emerges from FIG. 4 that no installation section 28 is provided on one side of the installation block 13. This embodiment of the installation block 13 is used when only profiles with U-shaped cross-sectional profile are used which are all aligned in one direction and thus no track 24 is present for the installation block 13 on the one side, into which an installation section 28 could be inserted.

The thickness of the profiles 14, 16 in the normal direction of the dry wall may for example be 60 mm. Accordingly, the installation section 28 of the installation block 13 has a width of 55 mm such that it may be easily inserted between the edges forming the track 24. The dry wall construction panels 30, 32 are located outside on both sides of the profiles 14, 16, the dry wall construction panels may have a thickness of 12.5 mm. In this case, an installation block thickness d1 of 85 mm results for the installation block 13, so that the recess-free intersection results from the dry wall construction panels 30, 32 to the installation block 13.

Since the installation block 13 is supported by the stud frame 12 and the material strength is not designed to support larger loads, the installation block has a low weight. Gypsum itself has a density of 2.3 kg/l and by using inorganic lightweight fillers, the density may be reduced to under 1.0 kg/l or below this. As a result of the low weight, the assembly of the installation block 13 is, on the one hand, facilitated and on the other hand the danger of setting is reduced, whereby fractures in the completed dry wall 10 could form over time.

The invention claimed is:

1. A method for installing an installation block, comprising the steps of:
    inserting a first installation block part into a stud frame of a dry wall being constructed from below a pipe, a conduit, or a cable laid through the dry wall and receiving the pipe, the conduit, or the cable into a first portion of a through-hole in the first installation block part; and
    inserting a second installation block part into the stud frame of the dry wall from above the pipe, the conduit, or the cable and receiving the pipe, the conduit, or the cable into a second portion of the through-hole in the second installation block to form the installation block and to form the through-hole;
    wherein the first and the second installation block parts have a separating plane, wherein the first and the second installation block parts may be separated from each other in the separating plane, and wherein the separating plane is disposed a distance away from a plane that intersects a longitudinal axis going through the center of the through-hole.

2. The method according to claim 1, wherein the first and the second installation block parts are attached to the stud frame.

3. The method according to claim 1, wherein the installation block has an installation section that is inserted into a track of the stud frame of the dry wall.

4. The method according to claim 3, wherein the installation section is formed as a lateral protrusion of the installation block and wherein a thickness of the lateral protrusion is smaller than a thickness of the installation block.

5. The method according to claim 3, wherein the installation section is disposed centrally at a side of the installation block.

6. The method according to claim 1, wherein a density of the installation block is between 0.5 kg/1 and 1.1 kg /l.

7. The method according to claim 1, wherein the installation block comprises mineral fibers or inorganic lightweight fillers.

\* \* \* \* \*